United States Patent [19]

Koch

[11] 4,063,718
[45] Dec. 20, 1977

[54] PROCESS AND APPARATUS FOR EXTRUDING PLASTIC AND SIMILAR MATERIALS

[75] Inventor: Klaus Koch, Gleidingen, Germany

[73] Assignee: Paul Troester Maschinenfabrik, Germany

[21] Appl. No.: 727,990

[22] Filed: Sept. 29, 1976

[30] Foreign Application Priority Data

Sept. 29, 1975 Germany .............................. 2543328

[51] Int. Cl.² ............................................... B29B 1/10
[52] U.S. Cl. ........................................ 366/75; 366/76; 366/88; 366/139
[58] Field of Search ................... 259/191, 192, 193, 9, 259/10, 21, 23, 24, 25, 26, 97

[56] References Cited

U.S. PATENT DOCUMENTS

| | | | |
|---|---|---|---|
| 3,148,231 | 9/1964 | Spencer | 425/145 |
| 3,274,647 | 9/1966 | Andouart | 259/192 |
| 3,712,594 | 1/1973 | Schippers | 259/191 |

*Primary Examiner*—Edward J. McCarthy
*Attorney, Agent, or Firm*—Robert E. Burns; Emmanuel J. Lobato; Bruce L. Adams

[57] ABSTRACT

Extruding apparatus comprises a first screw extruder feeding into the inlet of a second screw extruder, such inlet being located at an intermediate position between the driving means and the discharge of the second extruder. Degassing means which applies a vacuum to the material fed into the second extruder tends to draw off particles of material entrained in the gas which is drawn off. The screw of the second extruder has a first screw portion which acts in a direction to propel the main mass of material from the inlet to the discharge of the second extruder and a second screw portion which acts in the opposite direction to propel the drawn off material from the inlet to an outlet which is located between the inlet and the driving means and which opens into a vacuum chamber. A third screw portion located between the outlet and the driving means acts in the same direction as the first portion and hence toward the outlet.

4 Claims, 1 Drawing Figure

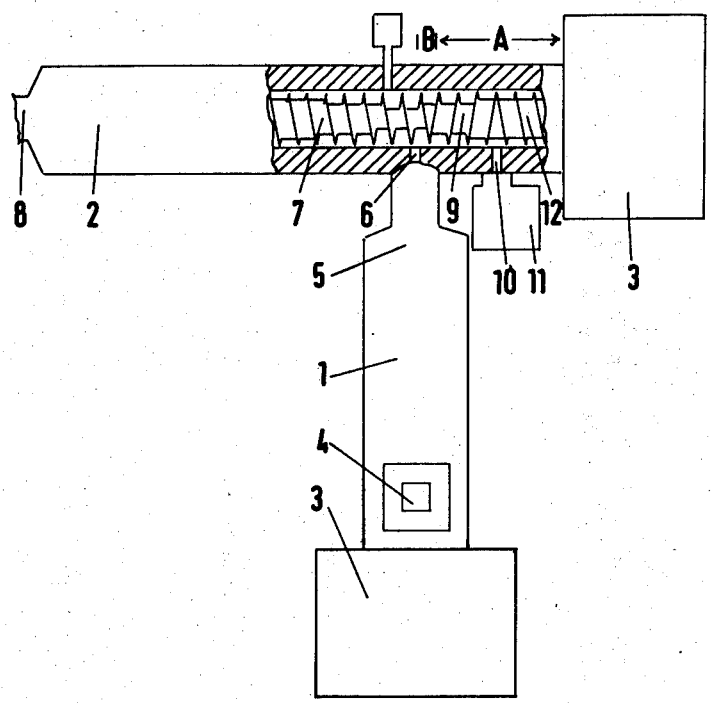

PROCESS AND APPARATUS FOR EXTRUDING PLASTIC AND SIMILAR MATERIALS

FIELD OF INVENTION

The present invention relates to a process and apparatus for extruding plastic material, rubber and other thermoplasts and elastomers. The apparatus consists of two screw extruders of which the first feeds into the second. In particular, the invention relates to such apparatus having means for degassing the material fed into the second extruder.

BACKGROUND OF INVENTION

Apparatus of this kind for extruding plastic material is known. It is used where the requirements of a particular duration of treatment of the material in the extruder and a good degassing cannot be attained in a single screw extruder. The two extruders are assembled in an L-form. A corresponding right angle arrangement for three extruders is also known. Although with this extruder arrangement the material to be extruded can be processed in the extruder for the required time and although the extruded material has at first satisfactory homogeneity, it has been observed that a deterioration occurs in the course of continued operation. In particular, it has been found that the extruded material contains small peices of material which have had a much longer residence in the extruder so that these material pieces disturb the homogeneity of the extruded material.

The present invention is based on the recognition that these small pieces of material with a high dwell time are particles which originate at the degassing position through the bursting of gas bubbles in the material to be extruded. These particles are deposited on the not fully filled screw in the degassing zone and can remain here a long time when they are carried along the vacuum at the degassing position in the direction of the vacuum connection. For in this zone between the degassing position and the vacuum connection there is a screw portion which is cut so as to act in the extrusion direction but which is not reached by the material stream as this is taken by the screw directly at the feed position. In the zone between the feeding position and the vacuum connection the material deposited on the screw remains there until the amount of material has become so great that it engages the inner wall of the cylinder and is thereupon propelled by the screw. However, it is a long time before sufficient material has been deposited on this part of the screw that a propulsion of the material is attained. As the time span between the depositing of the material and its propulsion by the screw is great, the collected material remains a long time on the screw. During this time the material undergoes a change under the temperature prevailing at this position which degrades it with respect to the main material stream. If this part with its altered characteristics is then advanced into the material stream, a non-homogeneous extrudant will result.

SUMMARY OF THE INVENTION

It is an object of the invention to overcome this objection. The invention is directed to the problem of preventing those portions of material which have been drawn off from the material stream in the degassing zone for instance the bursting of gas bubbles and have remained a long time on the extruder without being taken into the material stream from thereafter entering the material stream.

The invention solves this problem by separating from the main material stream those particles of the material produced by for instance the bursting of gas bubbles in the vacuum zone and leading these particles off through a different path.

The invention carries out this process by means of apparatus in which the feed inlet of the second extruder is arranged in an intermediate part of the extruder and that between the position of the feed inlet and the extruder drive, there is a portion of the extruder screw which is of opposite pitch to the main portion of the screw so that in the zone of degassing the separated material is propelled to a separate outlet.

Through the invention it is achieved that material resulting from material particles produced by the bursting of gas bubbles during the degassing with longer dwell time in the extruder can no more enter the material stream but through the reverse portion of the extruder screw are led to a special outlet where these homogeneity disturbing materials are discharged from the extruder. It is hereby achieved that the extrusion product is free from such material pieces and therefore an outstanding homogeneity is achieved during the entire time of operation of the extrusion apparatus.

If the outlet for the material carried over from the degassing means is not located directly next to the extruder drive, it is desirable to provide between the outlet and the drive a further portion of the extruder screw having the same direction as the main forwarding portion of the screw. Thereby, this portion together with the reverse portion propel the material to the outlet for the separated material.

It is advantageous for the outlet for the separated material to open into a vacuum chamber which is preferably sufficiently large that it seldom needs to be emptied. Preferably this outlet for the carried over material serves as the connection for the vacuum means.

BRIEF DESCRIPTION OF DRAWING

The nature, objects and advantages of the invention will be more fully understood from the following description in conjunction with the accompanying drawing in which the single view is a schematic plan of apparatus in accordance with the invention with portions cut away to show the interior.

DESCRIPTION OF PREFERRED EMBODIMENT

As illustrated schematically in the drawing, the apparatus in accordance with the invention comprises two extruders 1 and 2 which are assembled in an L-shaped configuration so that material from extruder 1 is fed into extruder 2. Each of the extruders has its own drive means 3 at one end and a discharge at the opposite end. The material that is to be extruded is introduced in unworked form, into the feed hopper 4 of the first extruder 1. In the interior of the extruder 1 this material is worked through the movement of the screw (not shown). It leaves the extruder 1 at the discharge end 5 where the extruder 1 is fixed to the inlet 6 of the second extruder 2.

The inlet 6 is located in an intermediate part of the second extruder 2 at a distance A from the drive 3. In this zone the extruder screw is formed in a particular way. A portion 7 of the extruder screw extending from the inlet 6 to the discharge end 8 of the second extruder has a helical web for propelling the material toward the discharge 8 when the screw is rotated by the drive 3. A second portion 9 of the screw between the inlet 6 and an outlet 10 located between the inlet 6 and the drive 3 has a helical web of the reverse direction so as to propel material in a direction from the inlet 6 to the outlet 10. This outlet 10 opens into a chamber 11 into which material separated from the main mass of material in the degassing zone of the extruder is discharged. The vacuum equipment for producing the degassing is connected to the chamber 11 so that the outlet 10 serves at the same time as the connection of the vacuum equipment to the extruder.

If the outlet 10 is spaced from the drive 3 as shown in the drawing, a third portion 12 of the extruder screw between the outlet 10 and the drive has a helical web in the same direction as the first screw portion 7 so as to forward material toward the outlet 10. Thus, the material is propelled toward the outlet 10 both by the screw section 9 and the screw section 12.

In order that all of the material which is fed by the extruder 1 into the extruder 2 will be engaged by the screw portion 7 and forwarded to the discharge 8 of the extruder 2, the portion 7 of the extruder screw which has a web helically arranged in a direction to propel the material toward the discharge 9 extends for the full distance between the inlet 6 and the discharge 8 and also a short distance in the direction toward the drive 3 as can be seen in the drawing. Only then does the forwardly directed screw portion 7 join the reverse screw portion 9. Ths distance B between the inlet 6 and the point of junction between the screw sections 7 and 9 is small.

It will be understood by those skilled in the art that various variations and modifications may be made in the apparatus and thus the invention is in no way limited to the embodiment shown by way of example in the drawing. For example, two extruders corresponding to the extruder 1 can be arranged to feed into opposite sides of the extruder 2 so as to be arranged in a T formation. Still other modifications and variations will be apparent to those skilled in the art.

What I claim is:

1. Apparatus for extruding plastic material, and rubber and other thermoplasts and elastomers, comprising two screw extruders of which a first extruder feeds into a second extruder, each of said extruders comprising an extruder screw rotatable in a housing and having driving means at one end of the housing and a discharge at the opposite end, said second extruder having an inlet with which the discharge of said first extruder is connected and having degassing means associated with said inlet, the housing of said second extruder having an outlet between said inlet and said driving means, and the screw of said second extruder having between said inlet and the discharge of said second extruder a screw portion acting in a direction to propel material from said inlet to said discharge and having between said inlet and said outlet a screw portion of reverse pitch for propelling from said inlet to said outlet material that is separated by said degassing means.

2. Apparatus according to claim 1, in which the screw of said second extruder has a further screw portion between said outlet and said driving means acting in a direction to propel material toward said outlet.

3. Apparatus according to claim 1, in which said outlet of said second extruder opens into a chamber to which vacuum is applied.

4. A process of extruding plastic material which comprises feeding said plastic material into the inlet of a screw extruder comprising an extruder screw rotatable in a housing, applying a vacuum to said material so fed to degas it whereupon particles of material are separated from the remaining mass of material by the vacuum, propelling said separated particles by said screw in one direction from said inlet to an outlet in said housing and propelling said remaining mass of material in the opposite direction by said screw from said inlet to the discharge of said extruder.

* * * * *